United States Patent [19]

Mansell et al.

[11] 4,011,523
[45] Mar. 8, 1977

[54] AZIMUTHAL MODE CONTROL FOR LASER

[75] Inventors: Dennis N. Mansell, Rancho Palos Verdes; Donald L. Bullock, Los Angeles; Stuart G. Forbes, Redondo Beach, all of Calif.

[73] Assignee: TRW Inc., Redondo Beach, Calif.

[22] Filed: Oct. 21, 1975

[21] Appl. No.: 624,355

[52] U.S. Cl. .................... 331/94.5 C; 356/106 LR
[51] Int. Cl.² .......................................... H01S 3/083
[58] Field of Search ............. 331/94.5; 356/106 RL

[56] References Cited

UNITED STATES PATENTS

| 3,486,130 | 12/1969 | Macek | 356/106 LR |
| 3,647,303 | 3/1972 | Kramer, Jr. | 356/106 LR |
| 3,649,931 | 3/1972 | Macek | 356/106 LR |

Primary Examiner—William L. Sikes
Attorney, Agent, or Firm—John J. Connors; Edwin A. Oser; Donald R. Nyhagen

[57] ABSTRACT

Azimuthal mode control for lasers employs an optical system which rotates the image to produce an optical feedback system, which through interference with the cavity fields, supresses the unwanted modes.

3 Claims, 5 Drawing Figures

AZIMUTHAL MODE CONTROL FOR LASER

BACKGROUND OF THE INVENTION

This invention relates to a method and apparatus for suppressing azimuthal modes in a laser cavity. More specifically, an optical system is employed which rotates a portion of the output laser beam and feeds this beam portion back into the laser cavity. A diffractive coupling occurs between the feedback beam and the output beam which reduces unwanted modes, particularly the azimuthal modes. The resultant far-field distribution is considerably improved.

Mode control problems existing in lasers are of the temporal type and involve phase coherence. However, large size lasers are now being built in which a different type of problem has emerged. This is caused by imperfect diffractive coupling of the beam through the output optics of the system and results in the formation of azimuthal modes.

Analogous to the case of imperfect temporal modes in a solid state laser, the formation of azimuthal modes causes a deterioration in the far-field pattern of the beam.

Azimuthal mode control becomes pronounced for laser parameters $A^2/\lambda L \geq$ about 50-100, where A represents the limiting radius of the output aperture, $\lambda$ is the wave length of the laser beam and L is the path length of the particular mode. This applies whether the laser medium is a solid, liquid, gas or plasma.

THE INVENTION

According to the invention, the entire beam, or a portion thereof, is optically rotated and geometrically fed back through the optical system into the cavity. Where the laser is of sufficient size, viz., having its Fresnel number of $A^2/\lambda L \geq$ about 50-100, this type of feedback supplements the diffractive coupling of the feedback to the main beam and reduces azimuthal mode formation.

One convenient means of optical rotation is achieved by an out-of-plane reflective feedback; this can be applied to unstable ring resonators, unstable resonators, etc.

IN THE DRAWINGS

Figure 4A:
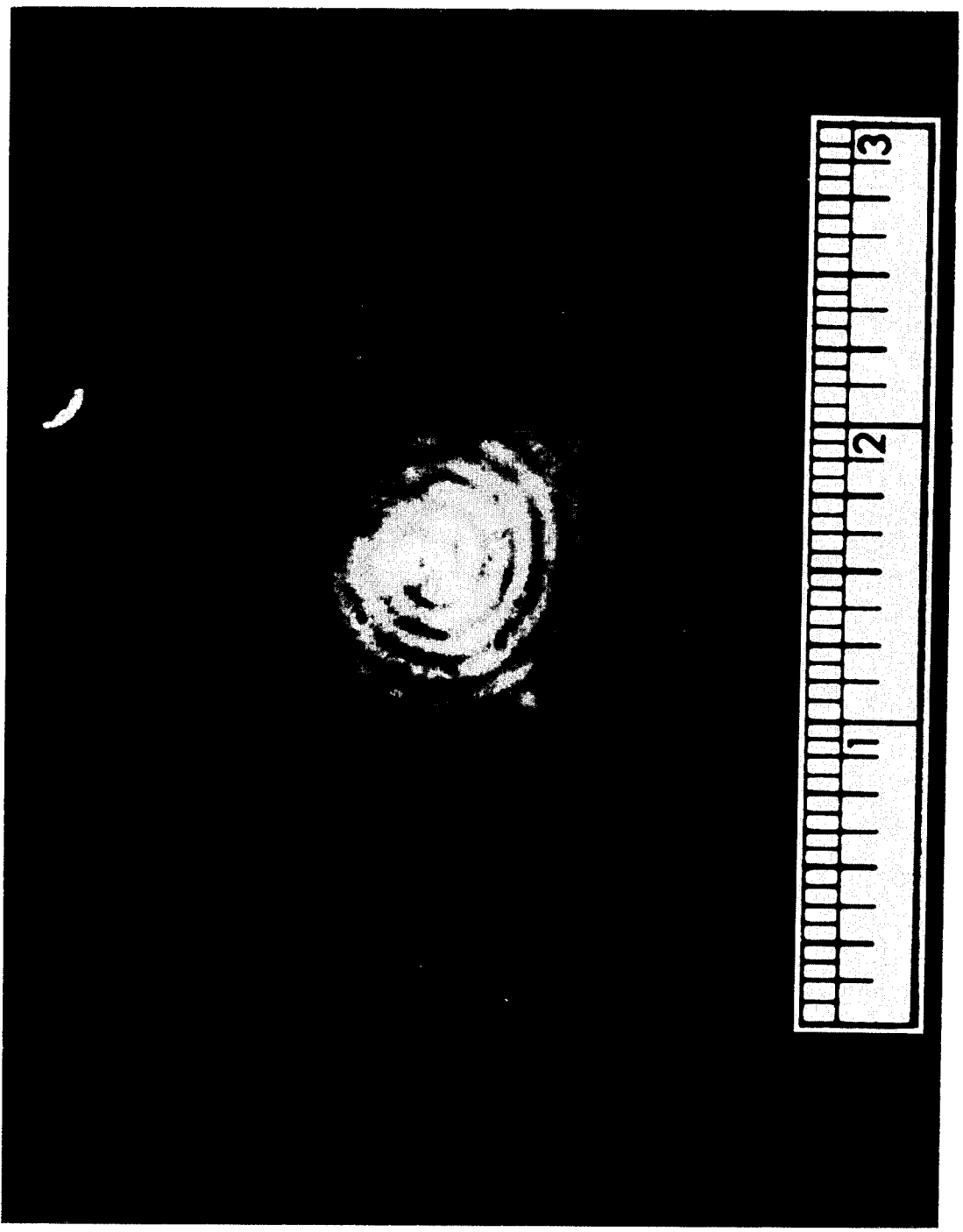

FIG. 4(a) and (b) respectively show a far-field view employing the image rotator of this invention and a far-field image without the rotation.

Figure 1:
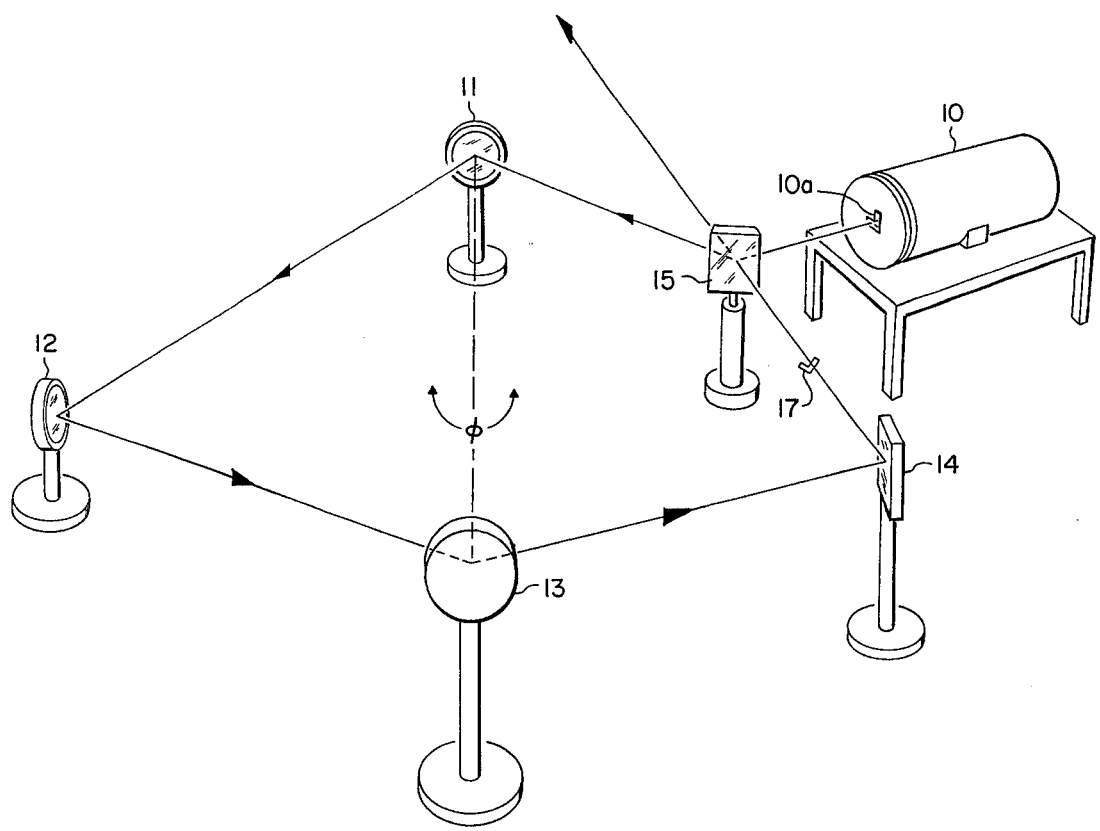
FIG. 1 is a schematic drawing in perspective showing one form of an apparatus for obtaining a beam rotation and feedback of a laser beam for a steady state continuous wave laser.

In the drawings, FIG. 1 shows an apparatus comprising a CW gas laser 10 having an L-shaped aperture 10a. Mirrors 11, 12, 13, 14 and 15 are provided to optically rotate and feed the beam back into the system.

Mirror 15 is partially coated and provides three functions: a) to reflect the beam from laser 10 to mirror 11; b) to transmit diffractively a portion of the rotated beam from mirror 14 for feedback into the system via mirror 11; and c) to pass part of the beam out of the system as shown.

It will be observed that the beam traces by mirrors 11, 12 and 13 are in a first plane, while the beam traces by mirrors 11, 13, 14 and 15 are in a second plane; a line 11–13 (dashed) is common to both planes. The effect of an out-of-plane reflection causes the beam to be rotated. This is shown by the rotation of the L-shaped beam configuration at the aperture 10a to its second position at point 17. If the angle between the two planes along 11–13 is $\theta$, then the beam will be rotated by $2\theta$.

Figure 2:
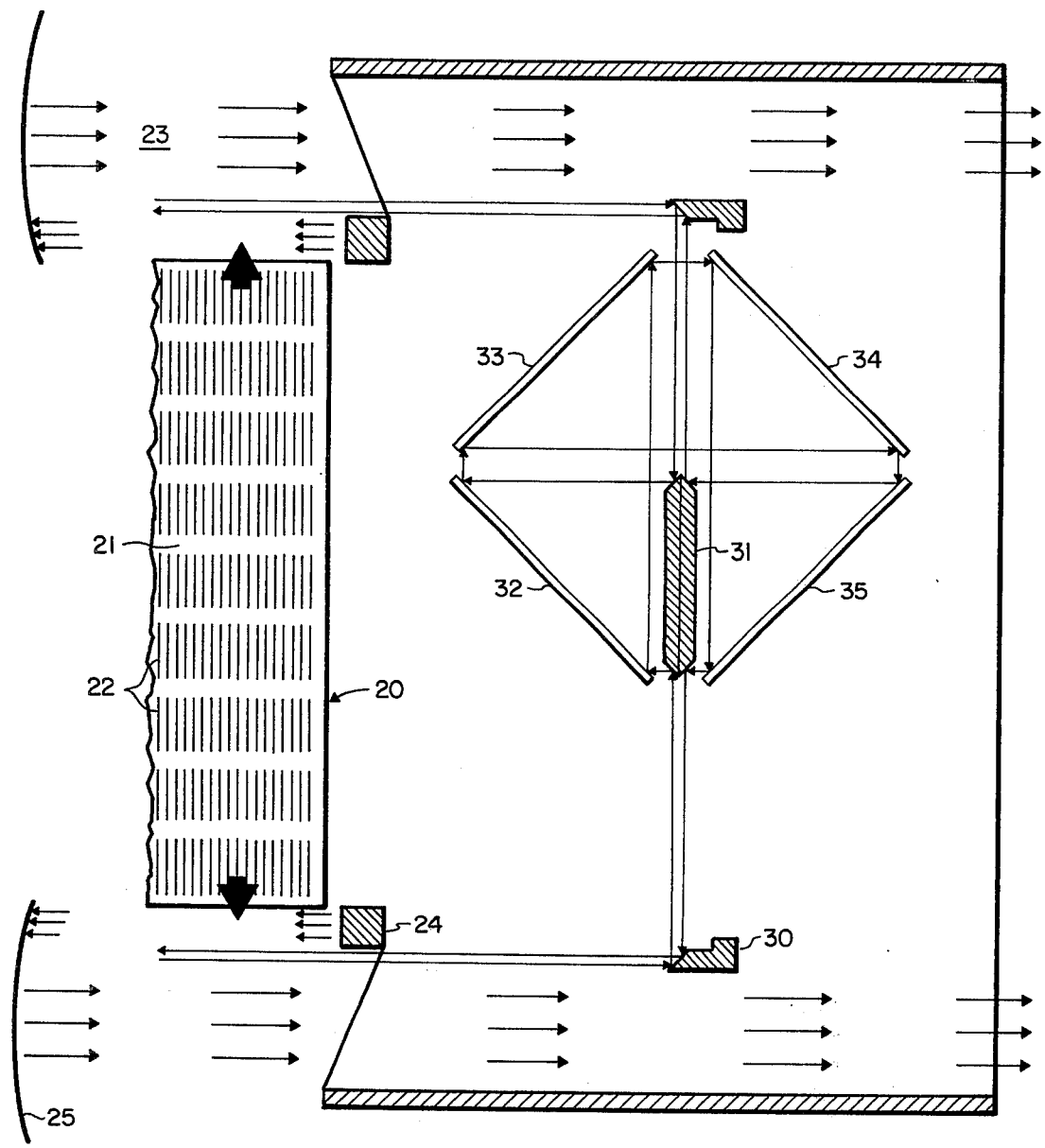
FIG. 2 is a cross-section view in side elevation showing another optical arrangement for out-of-plane rotation and feedback into a gas or plasma laser.

FIG. 2 shows an example of an optically rotated feedback system employing a cylindrical laser. A portion of the laser 20 is shown and provides an interior combustor portion 21 and a plurality of nozzle orifices 22. Fuels such as $D_2$ or $H_2$ are burned with $F_2$ in the combustor to form free fluorine which is then passed at supersonic speed in the direction shown by the arrows through the nozzle orifices in the combustor and into a laser cavity region 23 which is transverse to the gas flow and parallel to the cylindrical surface 20. Hydrogen or deuterium are injected into the cavity to form the lasing species HF* or DF* by reaction with the excess free florine.

Annular, cylindrically-shaped, cavity mirrors 24, 25 form an unstable oscillator to amplify the laser radiation (HF* or DF*) and pass it out of the cavity in the direction shown by the arrows. In the absence of a mode suppression device, there would be no means to diffractively couple the beam entirely around the mirrors 24, 25 when $A^2/\lambda L \geq$ about 50-100.

Consequently, azimuthal modes are formed in the output beam which reduce the far-field power intensity. In effect, the beam loses its coherence and becomes defocused. According to another aspect of this invention, a portion of the output beam is passed into an out-of-plane rotator system and then fed back into the unstable oscillator mirrors 24, 25 thereby rotating a portion of the cavity field.

The optical elements in the rotator system comprise a reflaxicon having an annular reflector 30 and beam splitter 31. Rotator mirrors 32, 33, 34 and 35 are disposed around the splitter 31 and are tilted to produce a non-coplanar optical path analogous to that of mirrors 11, 12, 13, 14, in FIG. 1. As shown from the direction of the rays, a portion of the output beam is intercepted by annular reflector 30 and reflected to the beam splitter 31 which then splits and reflects the beam onto rotator mirrors 32, 33, 34, and 35. The beam is then reflected by the rotator mirrors and returned by the beam splitter 31 to the annular reflector 30. The effect of this out-of-plane reflection is to rotate the image. When reflected from reflector 30 and fed back to cavity mirrors 24 and 25, an interactive coupling with the output beam will occur and couple the beam entirely around the mirrors 24, 25 to provide a significant improvement in the far-field image by suppressing azimuthal modes. The magnitude of improvement is in the order of 3:1 power increase in in the central lobe compared to omission of the reflecting system.

Figure 3:
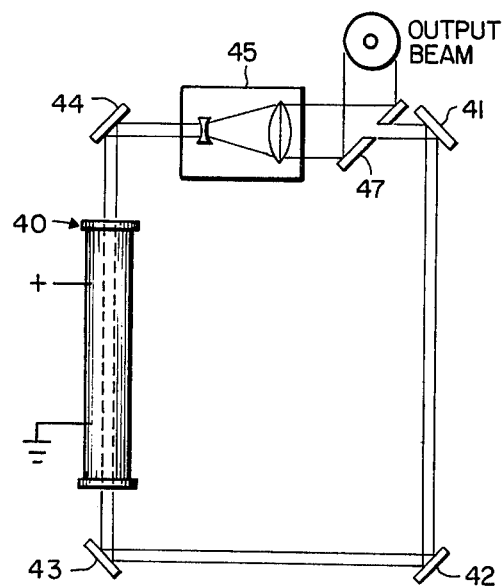
FIG. 3 is a schematic drawing showing a third form of producing optical rotation of a laser beam employing feedback through the laser itself.

FIG. 3 shows a third embodiment of this invention which includes a xenon gas discharge laser 40 fed from a plurality of optically flat mirrors 41, 42, 43 and 44. A Newtonian telescopic system 45 is provided to reflect the internal beam off a scraper mirror 47 and provide an output beam as shown. Part of the internal beam passes through the mirror 47 for optical feedback purposes. Mirror 42 is elevated thereby causing the beam to rotate.

FIG. 4a shows the far-field image employing the out-of-plane, optical feedback, image rotator of the invention as shown in FIG. 3. This shows an image having its main intensity concentrated at the center and having a clearly delineated ring structure which indicates a little loss of coherence and only a minor loss of power.

Figure 4B:
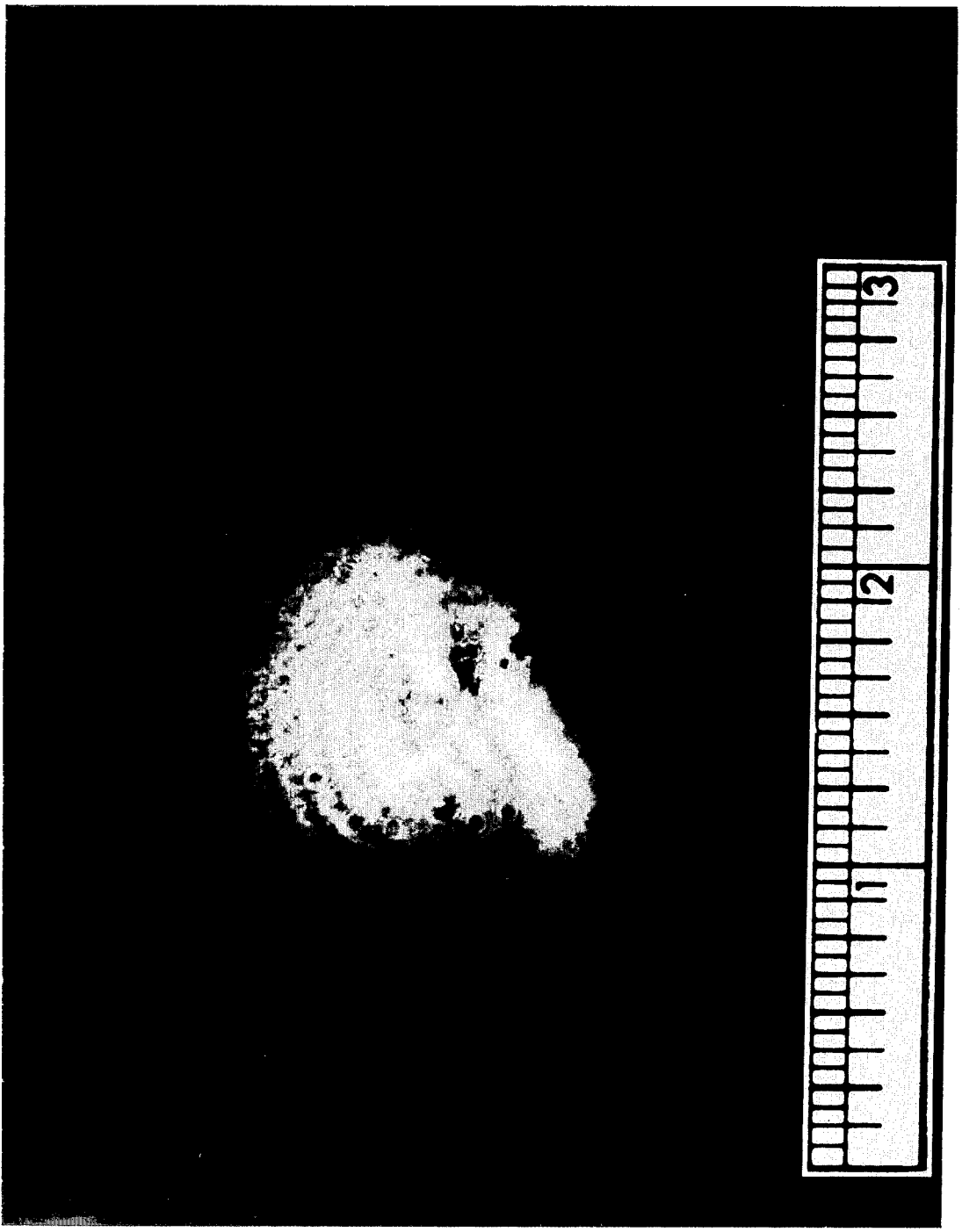

FIG. 4b shows the far-field view of an image which results where no image rotation is employed in the laser operation; i.e., when mirrors 41, 42, 43 and 44 all lie in the same plane. This image is considerably diffused as evidenced by its poor ring structure.

A 30° rotation of the beam was achieved for each path traverse in FIG. 4a.

We claim:

1. A laser system of the type having a large Fresnel number and an azimuthal mode control for its output beam, said system comprising:
   a. a laserable medium;
   b. means for pumping said laserable medium;
   c. an optical resonant cavity enclosing said medium for generating an output beam;
   d. means for geometrically rotating and optically mixing the output beam within said cavity;
   e. means for feeding the output beam back through the laser system; and
   f. output means for removing the beam from the system.

2. A laser system as defined in claim 1 wherein said means for geometrically rotating includes means for producing beam rotation by an out-of-plane reflection.

3. A laser system as defined in claim 1 wherein means is provided for feeding the beam back through said optical laser cavity.

* * * * *